United States Patent [19]

Sullivan

[11] 4,402,150

[45] Sep. 6, 1983

[54] VERIFICATION DEVICE

[75] Inventor: Paul F. Sullivan, Westwood, Mass.

[73] Assignee: Polaroid Corporation, Cambridge, Mass.

[21] Appl. No.: 262,120

[22] Filed: May 11, 1981

[51] Int. Cl.³ ..................... G03B 25/02; G03B 21/60; G09F 19/00

[52] U.S. Cl. ..................... 40/454; 40/616; 40/615; 40/626; 350/127; 430/7

[58] Field of Search .................. 40/2.2, 454, 616, 615, 40/453; 350/127, 128; 355/22; 354/112, 115, 125; 353/7; 430/7, 567

[56] References Cited

U.S. PATENT DOCUMENTS

| | | | |
|---|---|---|---|
| 1,475,430 | 11/1923 | Curwen | 40/454 |
| 2,262,492 | 11/1941 | Farrell | 40/2 R |
| 3,284,208 | 11/1966 | Land | 430/7 |
| 3,312,006 | 4/1967 | Rowland | 40/454 |
| 3,318,220 | 5/1967 | Battaglia et al. | 354/125 |
| 3,357,773 | 12/1967 | Rowland | 40/616 |
| 3,686,781 | 8/1972 | Calhoun, Jr. | 40/454 |
| 3,734,737 | 5/1973 | Sharp | 430/7 |
| 3,884,554 | 5/1975 | Lemelson | 40/454 |
| 3,990,895 | 11/1976 | Land | 430/567 |
| 4,076,384 | 2/1978 | Deml et al. | 350/127 |

OTHER PUBLICATIONS

J. A. Dobrowolski et al., "Optical Interference Coatings for Inhibiting of Counterfeiting", in Optica Acta, 1973, vol. 20, No. 12, pp. 925–937.

E. H. Land, "An Introduction to Polavision", in Photographic Science and Engineering, vol. 21, No. 5, Sep.-/Oct. 1977, pp. 225–236.

*Primary Examiner*—Gene Mancene
*Assistant Examiner*—Michael J. Foycik
*Attorney, Agent, or Firm*—Louis G. Xiarhos

[57] ABSTRACT

A verification device has a transparent sheet including parallel rows of lenticules and rows of colored lines in registration therewith. Verification is accomplished by observing optical effects presented by patterns of irregularly positioned rows of lenticules and corresponding colored lines viewed against a surrounding background area of regularly positioned rows of lenticules and corresponding colored lines.

19 Claims, 4 Drawing Figures

VERIFICATION DEVICE

Manufacturers of brand name products spend considerable effort and investment in establishing the reputation of such brand names with consumers. However, the established appeal of these brand names falls easy prey to counterfeiters who distribute their own products under fraudulent brand name labels. The "fraud industry" of brand name pirates is a nagging plague to consumer goods manufacturers that annually represents lost revenues amounting to hundreds of millions of dollars. The thriving fraud industry has invaded almost every segment of the market place, including the records and tapes of the music industry, fashion wear designer jeans, jewelry, beverages, cosmetics, and others.

Policing one's products in the market place is an enormous and complex task that thus far has eluded effective solution. Ideally, the brand name owner would like to rely on the discriminating eye of the consumer to distinguish his product from the counterfeit item; but, pirates have become so sophisticated in duplicating labels, designs, and general appearances of products that casual detection often is nearly impossible.

Now, according to the present invention, a verification device has been developed which exhibits optical effects that can be readily recognized by a consumer or be definitively authenticated by a policing authority.

The subject verification device generally comprises a transparent lenticular sheet material having a patterned arrangement of lenticules comprising regularly and irregularly positioned parallel rows of lenticules, the lenticules being in perfect registration with an array of parallel colored lines positioned opposite the lenticules. To provide the essential predetermined optical effect, regularly positioned rows of the lenticular surface are interrupted by row segments having lenticules (and corresponding colored lines) shifted from their regular position (e.g., creating patterns of irregular lenticular segments including rows closer together or farther apart). Depending on the particular arrangement of lenticules, the resulting device displays various optical effects, such as disappearing and reappearing images and flashing color changes wherein images and background areas of the display change coloration in different complementary sequences.

The selectively patterned lenticular sheets, as are employed in the present device, may be prepared by any of the conventional procedures well known for producing lenticular sheets. Specifically, a web of polymeric film base may be continuously contacted with a specially engraved rotating embossing roller, featuring the predetermined arrangement of regular and shifted, irregular positioned grooves according to the present invention, under appropriate conditions of temperature, pressure, and/or solvents to provide lenticules of the size and shape desired. The frequency of the lenticule rows can range widely; it is preferred, however, to employ sheets with lenticule frequency ranging from about 500 rows per inch to about 2000 rows per inch. Row frequency of about 1500 per inch is particularly preferred.

The colored lines in perfect registration with the parallel rows of lenticules can be formed, for example, using the process described in U.S. Pat. No. 3,284,208 issued Nov. 8, 1966 to Edwin H. Land. This patent discloses a process for preparing photographic multicolor screen elements exhibiting a high degree of optical acuity and particularly adapted for use in additive multicolor photographic processes, both conventional and diffusion transfer types, by successively coating on the smooth or flat surface of a regularly spaced lenticular film a plurality of photoresponsive layers. Each photoresponsive layer is subjected to exposure radiation incident on the lenticular film at angles adapted to provide exposed areas of the coating contiguous each lenticule. The unexposed areas of the coating are then removed and the exposed areas dyed to provide a series of chromatic filter elements. The incident radiation employed to effect exposure of successive photo-responsive layers is directed so as to provide formation of each series of chromatic filter element in substantial side-by-side or screen relationship on the smooth surface of the lenticular film.

The technical article by Edwin H. Land entitled "An Introduction to Polavision" published in *Photographic Science and Engineering,* vol. 21, pages 225-236 (1977), and U.S. Pat. No. 3,734,737 to John R. Sharp describes and illustrates how the process of the above Land patent can be used to produce microscopically fine, regular multicolor stripes with great precision by the following steps: (1) embossing a film base to form fine lenticules; (2) exposing a light-sensitive layer of dichromated gelatin on the opposite side of the base through the lenticules to form line images; (3) washing away the unexposed gelatin; and, (4) dyeing the lines that remain. The process is repeated to complete an ultrafine array of alternating color stripes in the pattern red, green, blue, red, green, blue, and so forth.

The subject verification device may comprise a lenticular sheet having an array of different color (e.g., red, green, and blue) stripes in registration therewith, or a single color stripe may be employed. The number of separate stripes aligned behind each lenticule generally may range from one up to as many as 100, depending on the frequency of lenticule rows per inch. The width of each stripe and the spacing between stripes can be varied; all the stripes behind each lenticule or behind separate lenticules need not be the same width; if a single stripe is used, its width may range up to as wide as the entire space behind the lenticule. If desired, colored lines can be omitted behind selected sections or rows of lenticules. The selection of stripe width and coloration is governed only by the particular optical effect sought to be achieved. Additional color stripes introduce additional verifiable optical effects and accompanying complexity of manufacture to enhance security. For purposes of illustration, however, a device using a single monochromatic (e.g., red) stripe has been chosen for more detailed discussion below.

The invention may be further understood by reference to the figures in which.

Figure 1:
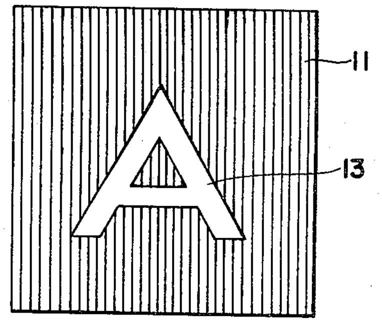
FIG. 1 is a frontal view of a verification device according to the present invention.

A basic embodiment of a verification device according to the present invention is shown in FIG. 1. The illustration is a frontal view looking through the lenticular surface of a transparent sheet to a monochromatic red-lined array in registration with the lenticules. The transparent sheet is shown viewed against a white surface so that white spacing appears between the lines of the red array. The background portion 11 of the device comprises a series of parallel, equally spaced lenticules; the image portion 13 of the device comprises a series of parallel lenticules having alternate rows of lenticules shifted from its regularly spaced position so that each row of lenticules is not equally spaced from its two adjacent lines. The verification device rapidly changes color as it is viewed from various angles about an axis parallel with the lenticular rows. Because of the differences in lenticule and corresponding colored line spacing, the optical effects of the image vary in a sequence different than that of the background. In the Figure, the display is shown viewed at an angle so that the image 13 appears in its white sequence against the background 11 in its red sequence.

Figure 2:
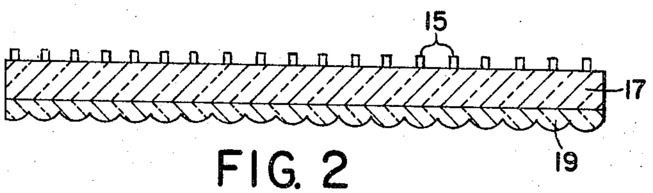
FIG. 2 is a schematic representation of a lenticular sheet having parallel lenticules on one side thereof and colored lines in registration therewith on the opposite side thereof.
Figure 3:
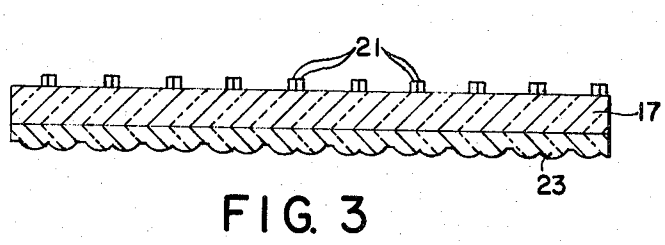
FIG. 3 is a schematic representation of a lenticular sheet having irregularly spaced parallel lenticules on one side and corresponding colored lines in registration therewith on the opposite side thereof; and, FIG. 4 is a diagram illustrating coloration effects of a device according to the present invention observed by a viewer at various viewing angles.

FIGS. 2 and 3 depict the lenticule and colored line relationships of the background and image areas respectively, as shown in FIG. 1. In the background area of the optical display, shown in FIG. 2, red-colored lines 15 are positioned on one side of sheet 17 in perfect registration with equally spaced parallel lenticules 19. The image area, shown in FIG. 3, also includes colored lines 21 on one side of sheet 17 in registration with corresponding lenticules 23. However, while each of lenticules 23 are in parallel disposition relative to one another, the position of alternate rows of lenticules is shifted so that the spacing of each lenticule row from its two adjacent lenticule rows is not equidistant, in contrast to the equal spacing of the background area lenticules (FIG. 2).

Figure 4:
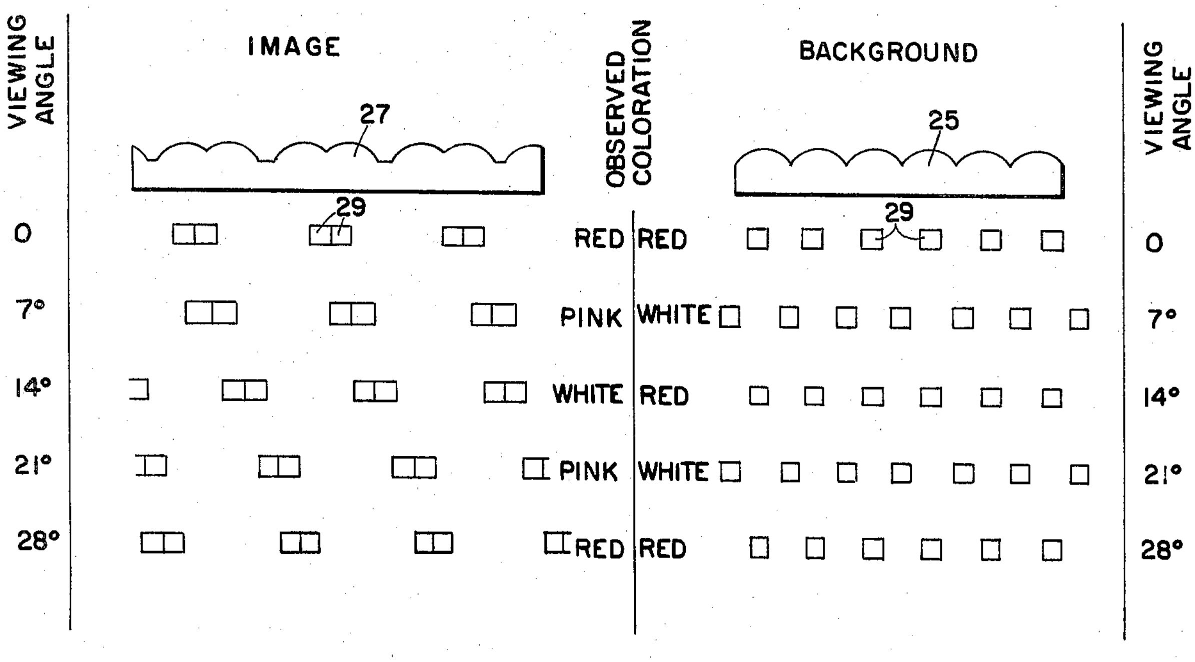

The observable coloration effects of a verification device having a regularly spaced lenticular background arrangement 25, as described above, interrupted by an irregularly spaced image lenticular arrangement 27, as described above, is illustrated by the diagram of FIG. 4. Although the colored lines may be any single color or a combination of colors, for purposes of illustration, the described coloration effects represent a verification device wherein red-colored lines 29 are positioned in registry with the lenticules. The device may be viewed by transmitted light, or by reflected light if the device is set against an opaque background. As described in FIG. 4, the transparent sheet is viewed against a white surface. To provide coloration between the colored lines and/or to alter the observed coloration of the lines, the device may be viewed against various other colored surfaces. The relative position of the red lines beneath the lenticules and the resultant coloration observed at viewing angles progressing from a position normal (perpendicular) to the display surface (0°) is shown by the successively viewed coloration moving down the diagram. The angles shown indicate degrees of viewing angle varying from normal towards a position parallel with the viewed surface. Optical effects vary with the frequency of lenticule rows and the thickness of the sheet. The color changes shown in the figure represent the change cycle obtained with a 0.0762 mm thick sheet having lenticules engraved at a frequency of 1500 per inch.

At a normal viewing angle, the background appears red, as the red lines directly behind each row of lenticules are viewed. As the angle of viewing is progressively altered, the background coloration switches from red to white to red to white, depending on whether the red lines area or the white interspacing between the lines is being viewed through the lenticules. Because of the shifted position of the lenticules in the image area, the observed coloration of the image at the various angles of viewing differs from that of the background. At 0°, the image coloration is red, as the red lines in registration with the lenticules are viewed. However, a transitional pink color stage also is introduced into the sequence between red and white. Since the lenticules and corresponding red lines are alternately shifted and, therefore, not equally spaced from adjacent lenticules and lines, at certain viewing angles, while red lines are viewed through some lenticules, white interspacing is viewed through others, resulting in an observed pink coloration. With the additional color stage and cycle alteration, image on background color effects switch from red on red (image disappears) to pink on white to white on red to pink on white back to red on red, and so on. An appealing and effective flashing color display is thus presented.

The image area of the device can be modified to display any fanciful or ordered pattern. For example, the image may take the form of an alphabetical, numerical, floral, or fanciful pattern. An official design or logo, or a name or phrase, readily could be employed. The verification device is very versatile and could be used on a product in any common manner, such as in the form of a label, a sticker, or a hang tag. It could be used alone; or, taking advantage of its transparency, it could be made part of a composite tag or label, such as an overlay over a standard tag or label. To prevent wear or abrasion of the device's fine array of colored lines, it is preferred to provide a protective coating over the exposed array surface. Typically, a coating of a clear, transparent polymeric material is used. Vinylidene chloride polymers or copolymers are preferred materials.

The optical effects of the described device accommodate ready verification using either macroscopic or microscopic modes of detection. Since the coloration and image effects are observable by the naked eye, a consumer has a convenient means of checking the authenticity of an article by viewing its characteristic display. Microscopically, a policing authority simply can count the predetermined lenticule frequency and/or the pattern of shifted rows of lenticules to determine the validity of a device.

In an alternative embodiment of the verification device, the patterned lenticular sheet and the mating array of colored lines may be separate elements. Using such an arrangement, for example, either element, set on a suitable support sheet, may be used on a product in the form of a label, sticker, tag, or transparent overlay, etc., as previously described. Microscopically, either element may be verified as previously described; macroscopically, to verify the authenticity of an article, one simply needs to mate the corresponding elements (i.e., superpose the lenticular sheet in registry over the colored line array to observe the characteristic pattern of optical effects). If the colored lines or lenticular sheet did not match, a wavy moire pattern would be seen instead of the verifying pattern.

For purposes of illustration, the verification device has been shown using a monochromatic line array. Additional colored lines can be introduced to create faster changing, more variable optical effects which may be used to further enhance security. Yet another element of security may be introduced through use of select dyes having unique properties in forming the colored line array. For example, the dyes used may comprise one or more infrared active materials whose activity then can be detected to confirm authenticity.

In the image area, the frequency of lenticule row position shifting can be modified to provide a wide variety of optical effects. The preferred frequency of shifted rows in the image pattern ranges from shifting segments of each row to row shifting in about every seventh row. In the embodiment wherein the lenticular sheet and colored line array form a unitary device, alternate row shifting provides an effective display and is particularly preferred. Where the lenticular sheet and colored line array are separate elements, shifting of each lenticular row in the image pattern provides a particularly preferred optical display. Unique optical effects also can be obtained with combinations of row shifting patterns.

While the invention has been particularly shown and described with reference to preferred embodiments thereof, it will be understood by those skilled in the art that various alterations in form and detail may be made therein without departing from the spirit and scope of the invention. Accordingly, it is intended that all matter contained in the above description or shown in the accompanying drawings be interpreted as illustrative and not limiting in nature.

What is claimed is:

1. A verification device providing predetermined optical effects by the viewing thereof at various viewing angles, said verification device comprising a transparent lenticular sheet having parallel rows of lenticules arranged in regularly positioned rows interrupted by shifted lenticule row segments within said rows to form a predetermined pattern of irregularly positioned lenticules in a background of regularly positioned lenticule rows, said parallel rows of lenticules being aligned with parallel colored lines positioned opposite said rows of lenticules and in registry with the lenticules.

2. The verification device of claim 1 wherein the frequency of said rows of lenticules ranges from about 500 to about 2000 rows per inch.

3. The verification device of claim 2 wherein said frequency is about 1500 rows of lenticules per inch.

4. The verification device of claim 1 including a plurality of monochromatic colored lines comprising red, green, or blue lines, or combinations thereof.

5. The verification device of claim 4 wherein said monochromatic lines are red.

6. The verification device of claim 5 wherein a single monochromatic red line is aligned in registry with each row of lenticules.

7. The verification device of claim 6 wherein the irregularly positioned rows of lenticules form an ordered pattern of image areas surrounded by background areas of regularly positioned rows of lenticules.

8. The verification device of claim 7 wherein said pattern is in the form of an official design or logo.

9. The verification device of claim 7 wherein the irregularly spaced rows of lenticules in the image pattern appear in a frequency ranging from every row of lenticules to every seventh row of lenticules.

10. The verification device of claim 9 wherein the device is a unitary structure comprising a sheet material supporting rows of lenticules on one surface thereof and corresponding colored lines on the other surface thereof.

11. The verification device of claim 10 wherein the ordered pattern comprises irregularly positioned row segments shifted in every alternate row of lenticules.

12. The verification device of claim 10 including a protective coating over the colored line surface.

13. The verification device of claim 12 wherein said protective coating is a vinylidene chloride polymer or copolymer.

14. The verification device of claim 10 including an opaque material mounted opposite the lenticular surface, so that the device is viewed by reflected light.

15. The verification device of claim 11 wherein the rows of lenticules have a frequency of about 1500 rows per inch and the image pattern is in the form of an official design or logo.

16. The verification device of claim 1 wherein said colored lines comprise an infrared active material.

17. The verification device of claim 1 wherein the device comprises a separate lenticular sheet and a separate corresponding colored line array.

18. The verification device of claim 17 wherein said row segments are shifted in every row from their regular position.

19. The verification device of claim 18 wherein the rows of lenticules have a frequency of about 1500 rows per inch and the image pattern is in the form of an official design or logo.

* * * * *